US012784327B2

(12) United States Patent
Won

(10) Patent No.: US 12,784,327 B2
(45) Date of Patent: Nov. 3, 2026

(54) METHOD OF DISPLAYING STEREOSCOPIC IMAGE AND DISPLAY SYSTEM PERFORMING THE SAME

(71) Applicant: SAMSUNG DISPLAY CO., LTD., Yongin-si (KR)

(72) Inventor: Byeong Hee Won, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 142 days.

(21) Appl. No.: 18/631,797

(22) Filed: Apr. 10, 2024

(65) Prior Publication Data

US 2025/0005845 A1 Jan. 2, 2025

(30) Foreign Application Priority Data

Jun. 30, 2023 (KR) ........................ 10-2023-0085164

(51) Int. Cl.

| | |
|---|---|
| ***G06T 15/10*** | (2011.01) |
| ***G06T 3/4007*** | (2024.01) |
| ***G06T 3/4046*** | (2024.01) |
| ***G06T 3/4053*** | (2024.01) |
| ***G06T 17/00*** | (2006.01) |
| ***G09G 3/00*** | (2006.01) |

(52) U.S. Cl.

CPC ............ *G06T 15/10* (2013.01); *G06T 3/4007* (2013.01); *G06T 3/4046* (2013.01); *G06T 3/4053* (2013.01); *G06T 17/00* (2013.01); *G09G 3/001* (2013.01); *G09G 2340/0407* (2013.01)

(58) Field of Classification Search

CPC ..... G06T 15/10; G06T 3/4007; G06T 3/4046; G06T 3/4053; G06T 17/00

See application file for complete search history.

(56) References Cited

U.S. PATENT DOCUMENTS

| | | | | |
|---|---|---|---|---|
| 8,368,690 | B1 * | 2/2013 | Hoppenstein ........ | H04N 13/239 348/42 |
| 10,721,460 | B2 | 7/2020 | Jeong et al. | |
| 2010/0265313 | A1 * | 10/2010 | Liu ........................ | H04N 23/68 348/E7.001 |
| 2013/0162630 | A1 * | 6/2013 | Kim ........................ | H04N 13/31 345/419 |
| 2017/0230647 | A1 * | 8/2017 | Han ..................... | H04N 13/305 |
| 2022/0399101 | A1 * | 12/2022 | Cai ........................ | G16H 50/20 |
| 2023/0057261 | A1 * | 2/2023 | Liu ...................... | H04N 19/184 |

FOREIGN PATENT DOCUMENTS

| | | |
|---|---|---|
| KR | 10-2012-0049997 | 6/2012 |
| KR | 10-1561525 | 10/2015 |
| KR | 10-2240564 | 4/2021 |
| KR | 10-2492367 | 1/2023 |
| WO | 2012064010 | 5/2012 |

* cited by examiner

*Primary Examiner* — Grace Q Li

(74) *Attorney, Agent, or Firm* — F. CHAU & ASSOCIATES, LLC

(57) ABSTRACT

A method of displaying a stereoscopic image includes: generating a three-dimensional model; mapping each sub-pixel among a plurality of pixels of a display panel to a corresponding one of the viewpoints to generate a mapping table; generating rendering image data for each of the viewpoints by rendering the three-dimensional model using the mapping table; and generating stereoscopic image data based on the rendering image data for each of the view-points.

20 Claims, 12 Drawing Sheets

METHOD OF DISPLAYING STEREOSCOPIC IMAGE AND DISPLAY SYSTEM PERFORMING THE SAME

This patent application claims priority under 35 U.S.C. § 119 to Korean Patent Application No. 10-2023-0085164, filed on Jun. 30, 2023, the disclosure of which is incorporated by reference in its entirety herein.

1. Technical Field

Embodiments of the disclosure are generally directed to a method of displaying a stereoscopic image and a display system performing the same. More specifically, embodiments of the disclosure are directed to a method of displaying a stereoscopic image generating stereoscopic image data and a display system performing the same.

2. Discussion of Related Art

A display device is used as a connection medium between a user and information. Examples of the display device include a liquid crystal display device and an organic light emitting display device.

A stereoscopic image display device is a display device that creates the illusion of depth in an image. For example, the stereoscopic image display device may provide different images to a left eye and a right eye of a viewer so that the viewer may view the stereoscopic image by binocular parallax between the left eye and the right eye.

An autostereoscopy method is a method for displaying stereoscopic images without the use of glasses. An example of the autostereoscopic method includes a lenticular method for separating left and right eye images using a cylindrical lens array and a barrier method for separating left and right eye images using a barrier. However, it may take a long time to generate stereoscopic images using the autostereoscopic method.

SUMMARY

An object of the disclosure is to provide a method of displaying a stereoscopic image that increases a speed at which stereoscopic image data is generated.

Another object of the disclosure is to provide a display system performing a method of displaying a stereoscopic image.

A method of displaying a stereoscopic image according to an embodiment of the disclosure includes: generating a three-dimensional model; mapping each sub-pixel among a plurality of sub-pixels of a display panel to a corresponding one of the viewpoints to generate a mapping table; generating rendering image data for each of the viewpoints by rendering the three-dimensional model using the mapping table; and generating stereoscopic image data based on the rendering image data for each of the viewpoints.

In an embodiment, the three-dimensional model may be rendered with respect to the sub-pixels mapped to the same viewpoint among the viewpoints.

In an embodiment, the three-dimensional model may be rendered with respect to the sub-pixels mapped to at least two adjacent viewpoints among the viewpoints.

In an embodiment, the three-dimensional image data may be generated by summing the rendering image data for each of the viewpoints.

In an embodiment, the generating three-dimensional model generates the three-dimensional model with a first resolution, and the method may further include up-scaling the rendering image data from the first resolution to second resolution higher than the first resolution.

In an embodiment, the second resolution may be a resolution of the display panel.

In an embodiment, the up-scaling may be performed through a super resolution algorithm utilizing deep learning.

In an embodiment, the rendering image data for a moving image may be up-scaled through an ultra high speed up-scaling algorithm, and the rendering image data for a still image may be up-scaled through a high definition up-scaling algorithm.

In an embodiment, the ultra high speed up-scaling algorithm may utilize bicubic interpolation.

In an embodiment, the high definition up-scaling algorithm may utilize a fast super resolution convolutional neural network.

A method of displaying a stereoscopic image according to an embodiment of the disclosure includes: generating three-dimensional model with a first resolution; generating rendering image data for each of a plurality of viewpoints by rendering the three-dimensional model; up-scaling the rendering image data from the first resolution to a second resolution higher than the first resolution; and generating stereoscopic image data by mapping each of the viewpoints of the rendering image data to sub-pixels.

In an embodiment, the second resolution may be a resolution of a display panel including the sub-pixels.

In an embodiment, the up-scaling may be performed through a super resolution algorithm utilizing deep learning.

In an embodiment, the rendering image data for a moving image may be up-scaled through an ultra high speed up-scaling algorithm, and the rendering image data for a still image may be up-scaled through a high definition up-scaling algorithm.

In an embodiment, the ultra high speed up-scaling algorithm may utilize bicubic interpolation.

In an embodiment, the high definition up-scaling algorithm may utilize a fast super resolution convolutional neural network.

A display system according to an embodiment of the disclosure includes a main processor and a display device. The main processor is configured to generate stereoscopic image data based on image data. The display device displays a stereoscopic image based on the stereoscopic image data. The display device includes a display panel including sub-pixels, lenses overlapping the sub-pixels, and a display panel driver configured to drive the display panel. The main processor processes the image data to generate a three-dimensional model, maps each of the sub-pixels to a corresponding one of the viewpoints to generate a mapping table, generates rendering image data for each of the viewpoints by rendering the three-dimensional model using the mapping table, and generates the stereoscopic image data based on the rendering image data for each of the viewpoints.

In an embodiment, the three-dimensional model may be rendered with respect to the sub-pixels mapped to the same viewpoint among the viewpoints.

In an embodiment, the three-dimensional model may be rendered with respect to the sub-pixels mapped to at least two adjacent viewpoints among the viewpoints.

In an embodiment, the generating the three-dimensional model with a first resolution, and the display panel driver up-scales the rendering image data from the first resolution to a second resolution higher than the first resolution.

A method of displaying a stereoscopic image according to embodiments of the disclosure may increase a rendering speed by rendering a three-dimensional model with respect to sub-pixels for each viewpoint.

A method of displaying a stereoscopic image according to embodiments of the disclosure may increase a rendering speed by rendering a three-dimensional model generated by modeling image data at a low resolution.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
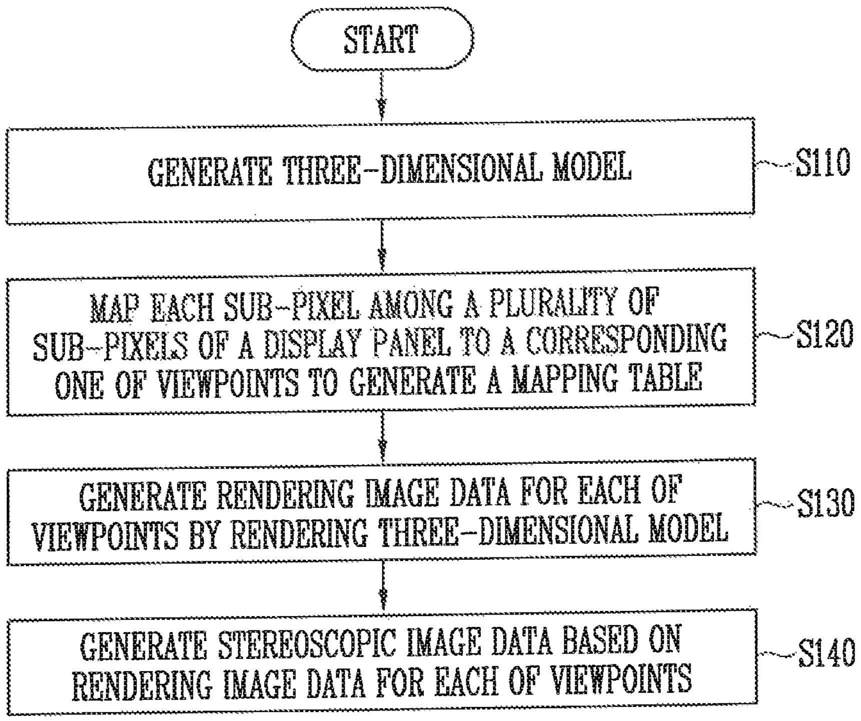
FIG. 1 is a flowchart illustrating a method of displaying a stereoscopic image according to an embodiment of the disclosure.

Hereinafter, embodiments according to the disclosure are described in detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiment described herein. However, the embodiment described herein is provided with sufficient detail to enable one of ordinary skill in the art to implement the technical spirit of the disclosure.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Here, "and/or" includes all combinations of one or more of corresponding configurations.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

FIG. 1 is a flowchart illustrating a method of displaying a stereoscopic image according to an embodiment of the disclosure.

Referring to FIG. 1, according to an embodiment, the method of displaying the stereoscopic image includes: generating a three-dimensional (3D) model (S110). In one embodiment, the three-dimensional model may be generated by converting (i.e., modeling) two-dimensional (2D) image data captured with a camera to three-dimensional image data (i.e., the three-dimensional model). In another embodiment, the three-dimensional model may be generated by converting (i.e., modeling) two-dimensional image data captured with a virtual camera to the three-dimensional image data (i.e., the three-dimensional model). In another embodiment, the three-dimensional model may be generated without two-dimensional image data. According to the embodiment, the method of FIG. 1 further includes mapping each of a plurality of the viewpoints of the three-dimensional model to sub-pixels (S120). For example, the sub-pixels may correspond to sub-pixels of a display panel that emit different colored light. According to the embodiment. The method of FIG. 1 further includes generating rendering image data for each of the viewpoints by rendering the three-dimensional model (S130). The generating of the rendering image data may include processing the three-dimensional model using a result of the mapping. According to the embodiment, the method of FIG. 1 further includes generating stereoscopic image data based on the rendering image data for each of the viewpoints (S140).

Hereinafter, the disclosure is specifically described with reference to FIGS. 2 to 8.

Figure 2:
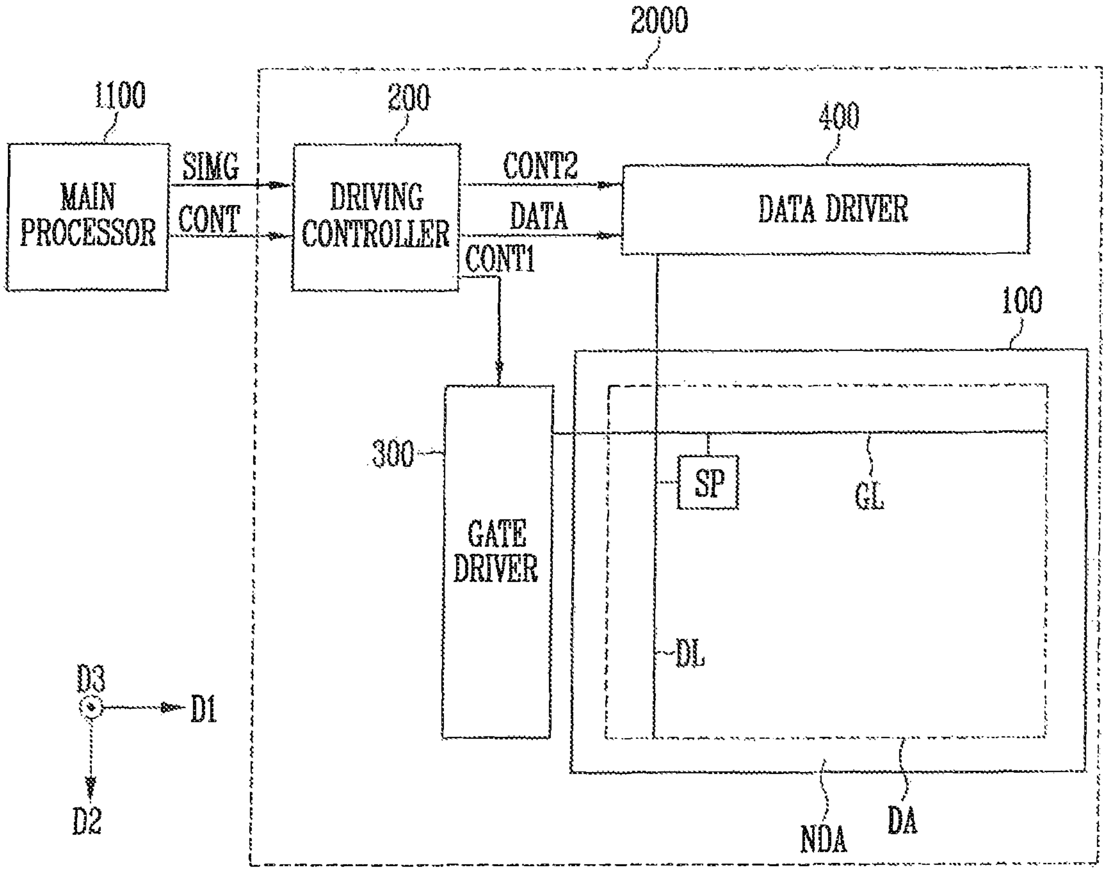
FIG. 2 is a block diagram illustrating a display system according to the method of displaying the stereoscopic image of FIG. 1.

FIG. 2 is a block diagram illustrating a display system according to the method of displaying the stereoscopic image of FIG. 1.

Referring to FIG. 2, the display system may include a main processor 1100 and a display device 2000. For example, the main processor 1100 may include one or more of a central processing unit (CPU) or an application processor (AP). The main processor 1100 may further include any one or more of a graphic processing unit (GPU), a communication processor (CP), and an image signal processor (ISP). The main processor 1100 may further include a neural processing unit (NPU). The NPU may be a processor specialized in processing an artificial intelligence model, and the artificial intelligence model may be generated through machine learning. The artificial intelligence model may include a plurality of artificial neural network layers. An artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNNs), a deep Q-networks, or a combination of two or more of the foregoing, but is not limited to the above-described example. The artificial intelligence model may include a software structure in addition to a hardware structure, additionally or alternatively. At least two of the above-described processing unit and processor may be implemented as one integrated configuration (for example, a single chip) or each may be implemented as an independent configuration (for example, a plurality of chips).

The main processor 1100 may generate stereoscopic image data SIMG. For example, when the stereoscopic image data SIMG includes 12 viewpoints, the stereoscopic image data SIMG may be image data that is a combination of 12 two-dimensional image data.

The display device 2000 may include a display panel 100 and a display panel driver (e.g., a panel driver circuit). The display panel driver may include a driving controller 200 (e.g., a controller circuit), a gate driver 300 (e.g., a first driver circuit), and a data driver 400 (e.g., a second driver circuit). In an embodiment, the driving controller 200 and the data driver 400 may be integrated into one chip.

The display panel 100 may include a display area DA for displaying an image and a non-display area NDA disposed adjacent to the display area DA. In an embodiment, the gate driver 300 may be mounted on the non-display area NDA.

The display panel 100 may include a plurality of gate lines GL, a plurality of data lines DL, and a plurality of sub-pixels SP electrically connected to the gate lines GL and the data lines DL. The gate lines GL may extend in a first direction D1, and the data lines DL may extend in a second direction D2 crossing the first direction D1.

The driving controller 200 may receive the stereoscopic image data SIMG and an input control signal CONT from the main processor 1100. For example, the stereoscopic input image data SIMG may include red image data, green image data, and blue image data. In an embodiment, the stereoscopic input image data SIMG may further include white image data. As another example, the stereoscopic input image data SIMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, and a data signal DATA, based on the stereoscopic input image data SIMG and the input control signal CONT.

The driving controller 200 may generate the first control signal CONT1 for controlling an operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling an operation of the data driver 400 based on the input control signal CONT and output the second control signal CONT2 to the data driver 400. The second control signal CONT2 may include a horizontal start signal and a load signal.

The driving controller 200 may generate the data signal DATA by receiving the stereoscopic input image data SIMG and the input control signal CONT. The driving controller 200 may output the data signal DATA to the data driver 400.

The gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages obtained by converting the data signal DATA into an analog voltage. The data driver 400 may output the data voltages to the data lines DL.

Figure 3:
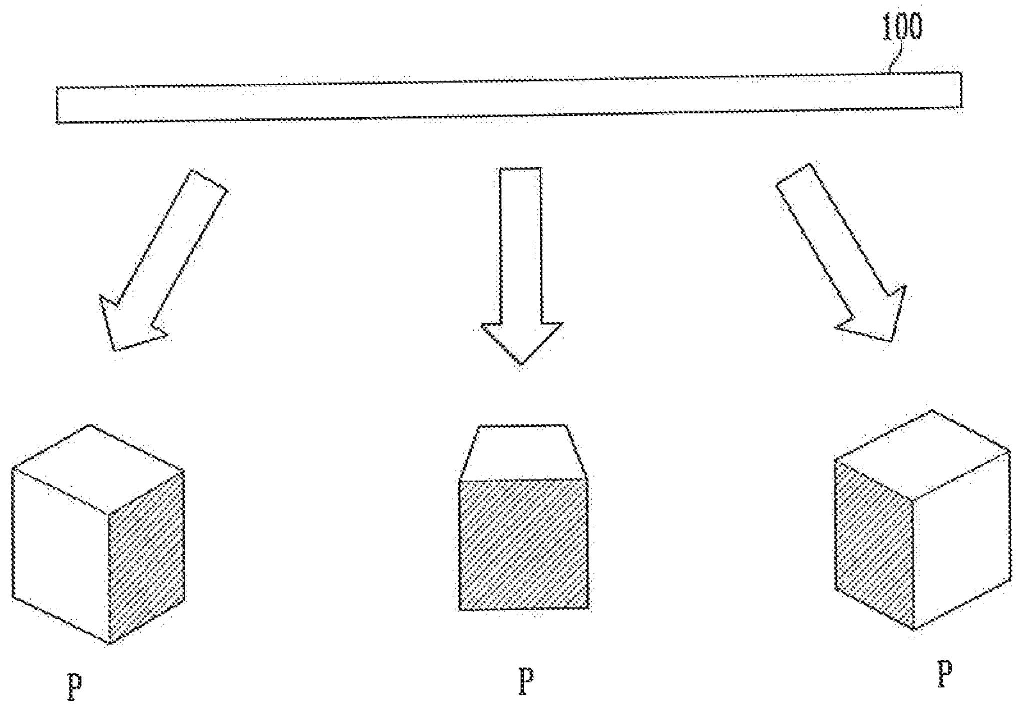
FIGS. 3 and 4 are diagrams illustrating a display device displaying a stereoscopic image of a lens array method.
Figure 4:
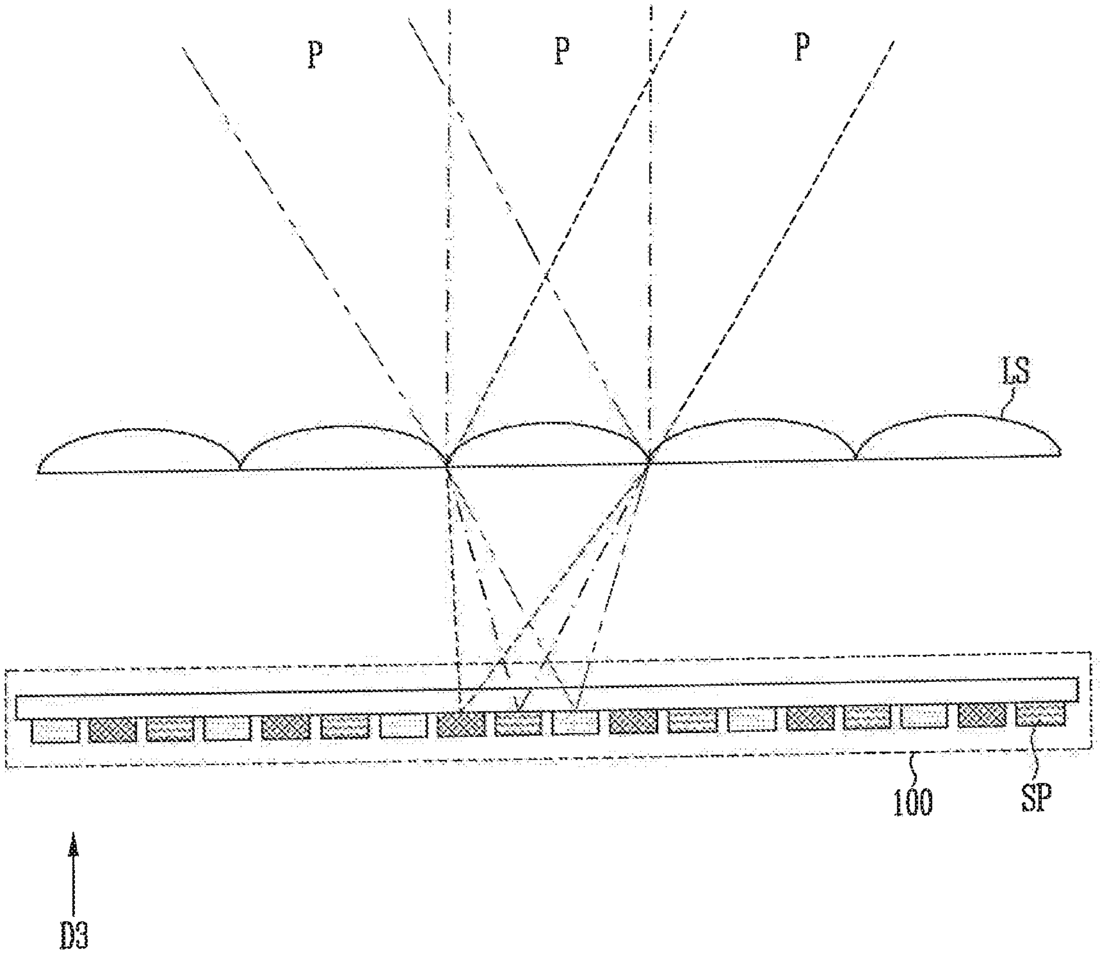

FIGS. 3 and 4 are diagrams illustrating a display device displaying a stereoscopic image of a lens array method.

Referring to FIGS. 2 to 4, the display device 2000 may display an image of a plurality of viewpoints P. For example, different images may be recognized by a viewer according to a viewing direction in which the viewer is viewing the display panel 100.

The display device 2000 may include the display panel 100 and lenses LS. The sub-pixels SP may be arranged in the first direction D1 and the second direction D2 crossing the first direction D1. The lenses LS may cross the sub-pixels SP in a third direction D3 crossing the first direction D1 and the second direction D2. For example, the lenses LS may overlap the sub-pixels SP in the third direction D3 or in a plan view.

The display panel 100 may include the sub-pixels SP that emit light to display an image. In an embodiment, each of the sub-pixels SP may output one of light of a first color (for example, red), light of a second color (for example, green), and light of a third color (for example, blue). However, this is an example, and a color of light emitted from the sub-pixels SP is not limited thereto, and light of various colors for full-color implementation may be output. The display panel 100 may include an organic light emitting display panel, a liquid crystal display panel, a quantum dot display panel, and the like.

The lenses LS may refract light incident from the sub-pixels SP. For example, a lens array LSA including the lenses LS may be implemented as a lenticular lens array, a micro lens array, and the like.

A light field display is a 3D display device implementing a stereoscopic image by forming a light field expressed as a vector distribution (intensity, direction) of light on a space using a flat panel display and an optical element (for example, the lenses LS). The light field display is a display technology that is expected to be utilized in various applications through convergence with augmented reality (AR) technology and the like, because the light field display may implement a more natural stereoscopic image by enabling viewing of a depth, a side surface, and the like of an object.

The light field may be implemented in various methods. For example, the light field may be formed in a method of creating a light field of various directions using a plurality of projectors, a method of controlling a direction of light using a diffraction grating, a method of controlling the direction and the intensity (luminance) of light according to a combination of each pixel using two or more panels, a method of controlling the direction of light using a pinhole or a barrier, a method of controlling a refraction direction of light through the lens array, and the like.

In an embodiment, the display device displaying the stereoscopic image of the lens array method displays the stereoscopic image (three-dimensional image) by forming the light field.

A series or subset of the sub-pixels SP may be allocated to a corresponding one of the lenses LS, and light emitted from each of the sub-pixels SP of the series or subset may be refracted by the corresponding lens LS, may proceed only in a specific direction, and thus may form the light field expressed as the intensity and the direction of the light. When a viewer looks at the display device 10 within the light field formed as described above, the viewer may perceive a three-dimensional effect of a corresponding image.

FIGS. 3 and 4 illustrate that the display device 2000 displays three viewpoints P, but the disclosure is not limited to this number of viewpoints P.

Figure 5:
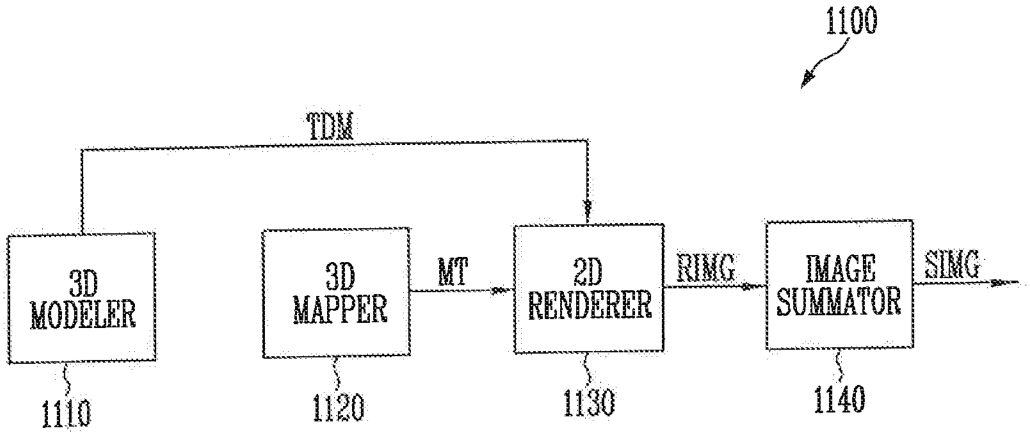
FIG. 5 is a block diagram illustrating an example of a main processor of FIG. 2.
Figure 6:
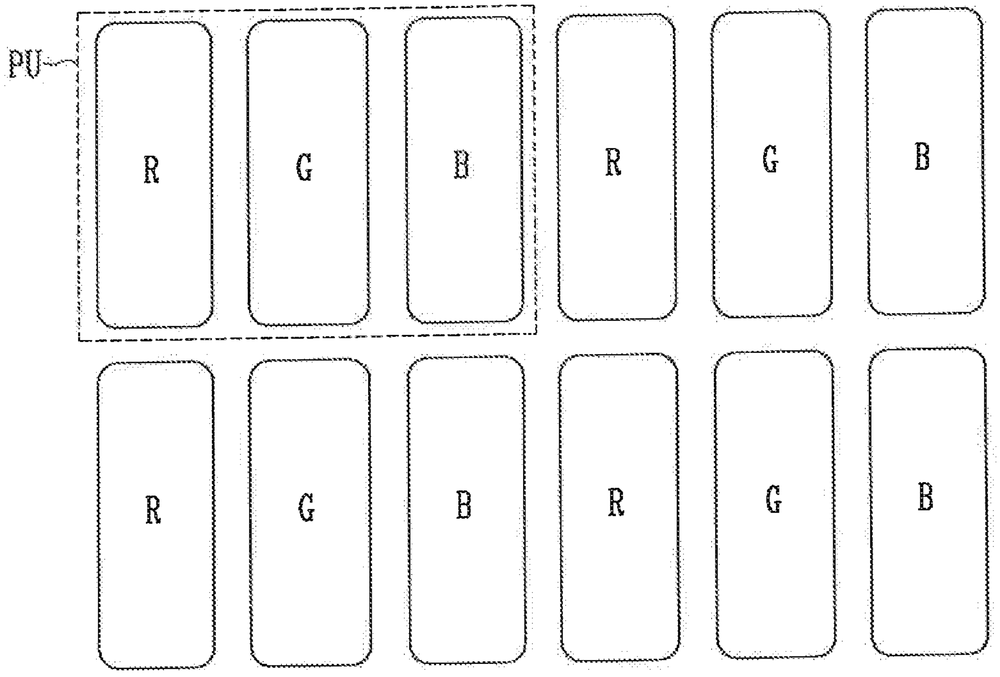
FIG. 6 is a diagram illustrating an example of a structure of sub-pixels of FIG. 2.
Figure 7:
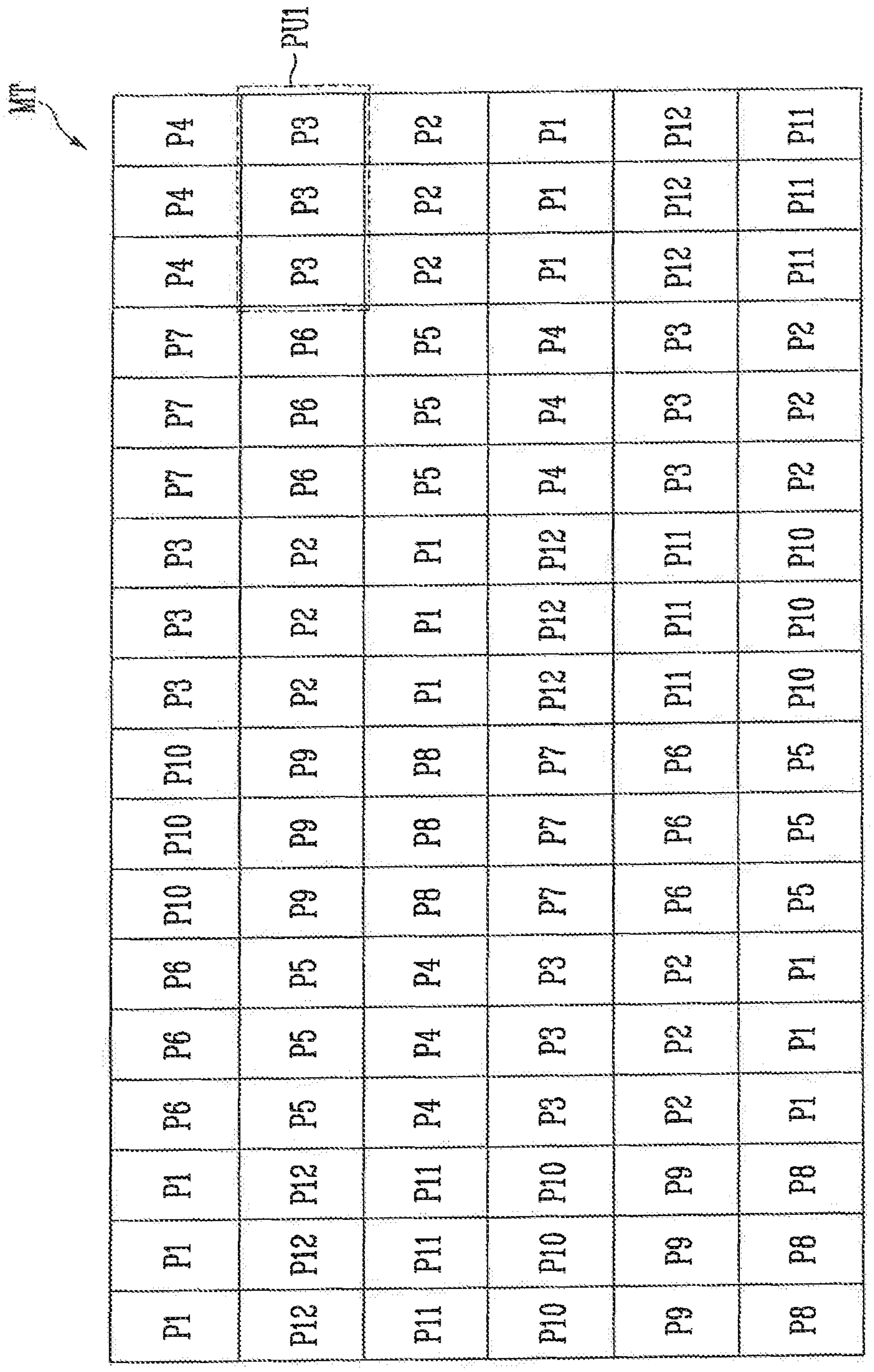
FIG. 7 is a diagram illustrating an example of a mapping table according to the method of displaying the stereoscopic image of FIG. 1.
Figure 8:
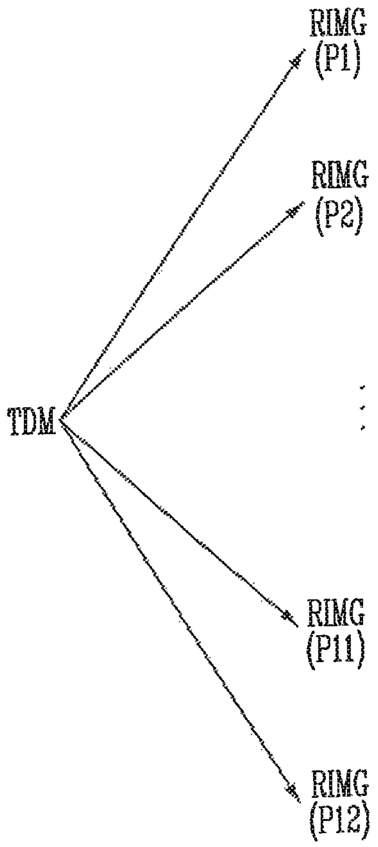
FIG. 8 is a diagram illustrating an example of rendering according to the method of displaying the stereoscopic image of FIG. 1.

FIG. 5 is a block diagram illustrating an example of the main processor of FIG. 2, FIG. 6 is a diagram illustrating an example of a structure of the sub-pixels of FIG. 2, FIG. 7 is a diagram illustrating an example of a mapping table according to the method of displaying the stereoscopic image of FIG. 1, and FIG. 8 is a diagram illustrating an example of rendering according to the method of displaying the stereoscopic image of FIG. 1.

Referring to FIG. 5, in an embodiment, the main processor 1100 includes a three-dimensional modeler 1110, a three-dimensional mapper 1120, a two-dimensional renderer 1130, and an image summator 1140. In an embodiment, each of the three-dimensional modeler 1110, the three-dimensional mapper 1120, the two-dimensional renderer 1130, and the image summator 1140 is implemented by a respective logic circuit.

The three-dimensional modeler 1110 may generate a three-dimensional model TDM. For example, the three-dimensional model TDM (e.g., model data) may include coordinate information and depth information of an object. For example, data of a three-dimensional model TDM may be composed of three-dimensional coordinate values, and colors and grayscale values at each three-dimensional coordinate value, etc. However, a data format of the three-dimensional model TDM of the present invention is not limited.

Referring to FIGS. 5 to 7, in an embodiment, the three-dimensional mapper 1120 maps each of the viewpoints P1 to P12 of the three-dimensional model TDM to some of the sub-pixels SP. In an embodiment, each sub-pixel SP of at least a part of the display area DA is mapped to a corresponding one of the viewpoints P1 to P12. The three-dimensional mapper 1120 may map one of the viewpoints P1 to P12 to each of the sub-pixels SP according to a direction in which light emitted from each of the sub-pixels SP is emitted. In an embodiment, information about the direction of emission may be received from an outside. In an embodiment, the three-dimensional mapper 1120 may determine the emission direction from a structure of the display panel 100 (see FIG. 4) and the lens LS (see FIG. 4). In this case, information about the structure of the display panel 100 (see FIG. 4) and the lens LS (see FIG. 4) may be received from the outside.

In an embodiment, the three-dimensional mapper 1120 may receive the viewpoints P1 to P12 displayed by each of the sub-pixels and map the viewpoints P1 to P12 to each of the sub-pixels. For example, the three-dimensional mapper 1120 may generate the mapping table MT by receiving the viewpoints P1 to P12 displayed by each of the sub-pixel SP. In another embodiment, the main processor 1100 may receive the mapping table MT from the outside. In this case, the main processor might not include the three-dimensional mapper 1120.

One pixel unit PU may include a first color sub-pixel R displaying a first color, a second color sub-pixel G displaying a second color, and a third color sub-pixel B displaying a third color. FIG. 7 illustrates the viewpoints P1 to P12 mapped to each of the sub-pixels SP according to the structure of the sub-pixels SP of FIG. 6. However, the disclosure is not limited to the structure of the sub-pixels SP. For example, all the sub-pixels of a pixel unit PU may be mapped to a same one of the viewpoints P1 to P12, but embodiments of the disclosure are not limited thereto.

The three-dimensional mapper 1120 may determine the sub-pixels SP on which each of the viewpoints P1 to P12 of the three-dimensional model TDM is displayed. For example, the first color sub-pixel R of a first pixel unit PU1 may display the third viewpoint P3 of the three-dimensional model TDM. For example, the second color sub-pixel G of the first pixel unit PU1 may display the third viewpoint P3 of the three-dimensional model TDM. For example, the third color sub-pixel B of the first pixel unit PU1 may display the third viewpoint P3 of the three-dimensional model TDM.

As shown in FIG. 4, light emitted from each of the sub-pixels SP may be refracted in a specific direction (that is, a specific viewpoint). Therefore, the three-dimensional mapper 1120 may generate a mapping table MT by mapping each of the viewpoints P1 to P12 to some of the sub-pixels SP. For example, the mapping table MT may map a first subset of the sub-pixels to the first viewpoint P1, map a second subset of the sub-pixels different from the first subset to the second viewpoint P2, etc.

Referring to FIGS. 5 and 8, the two-dimensional renderer 1130 may generate rendering image data RIMG for each of the viewpoints P1 to P12 by rendering the three-dimensional model TDM. For example, the rendering may include processing the three-dimensional model TDM using the mapping table MT. The rendering image data RIMG may be two-dimensional image data for each of the viewpoints P1 to P12 of the three-dimensional model TDM. For example, the display device may display the rendering image data RIMG for the first viewpoint P1 on the sub-pixels SP that emit light refracted to the first viewpoint P1, may display the rendering image data RIMG for the second viewpoint P2 on the sub-pixels SP that emit light refracted to the second viewpoint P2, etc. For example, the two-dimensional renderer 1130 determines which image data part of the three-dimensional model TDM is associated with the first viewpoint P1, accesses the mapping table MT to determine which sub-pixels are associated with the first viewpoint P1, and generates first rendering image data for the determined sub-pixels from the determined image data part so it can be later displayed on the determined sub-pixels. In the example shown in FIG. 7, the two-dimensional renderer 1130 would determine the first through third sub-pixels in a first row, the tenth through twelfth sub-pixels in a third row, and the fourth through seventh sub-pixels in a six row are associated with the first viewpoint P1; and generate first rendering image data for the determined sub-pixels from a portion of the three-dimensional model TDM associated with the first viewpoint P1.

The two-dimensional renderer 1130 may determine which image data part of the three-dimensional model TDM is associated with any viewpoint based on the three-dimensional coordinates.

The three-dimensional model TDM may be rendered with respect to the sub-pixels SP mapped to the same viewpoint among the viewpoints P1 to P12. For example, the rendering image data RIMG for the first viewpoint P1 may include data (for example, pixel data) of an image displayed on the sub-pixels SP mapped to the first viewpoint P1. That is, in generating the rendering image data RIMG for the first viewpoint P1, the two-dimensional renderer 1130 may consider only the sub-pixels mapped to the first viewpoint P1 instead of all sub-pixels SP. Accordingly, rendering of the three-dimensional model TDM may reduce a rendering time compared to generating the rendering image data RIMG for each of the viewpoints P1 to P12 with respect to all sub-pixels SP.

The image summator 1140 may generate the stereoscopic image data SIMG based on the rendering image data RIMG for each of the viewpoints P1 to P12. In an embodiment, the stereoscopic image data SIMG may be generated by summing the rendering image data RIMG for each of the viewpoints P1 to P12. For example, the rendering image data RIMG for viewpoint P1 may include zero grayscale values for the subpixels of viewpoints P2-P12, the rendering image data RIMG for viewpoint P2 may include zero grayscale values for the subpixels of viewpoints P1 and P3-P12, etc.

For example, the rendering image data RIMG for the first viewpoint P1 may include data for an image displayed on the sub-pixels SP mapped to the first viewpoint P1, and the rendering image data RIMG for the second viewpoint P2 may include data for an image displayed on the sub-pixels SP mapped to the second viewpoint P2. The stereoscopic image data SIMG generated by summing the rendering image data RIMG for the first to twelfth viewpoints P1 to P12 may include data for an image displayed on all sub-pixels SP.

For example, two-dimensional renderer 1130 could perform a process at a first time to generate first rendering image data RIMG for the first viewpoint P1, perform the process a second time to generate second rendering image data RIMG for the second viewpoint P2, . . . , perform a process a twelfth time to generate twelfth rendering image data RIMG for the twelfth viewpoint P12, and the image summator 1140 could sum the first through twelfth rendering image data to generate the stereoscopic image data SIMG.

Figure 9:
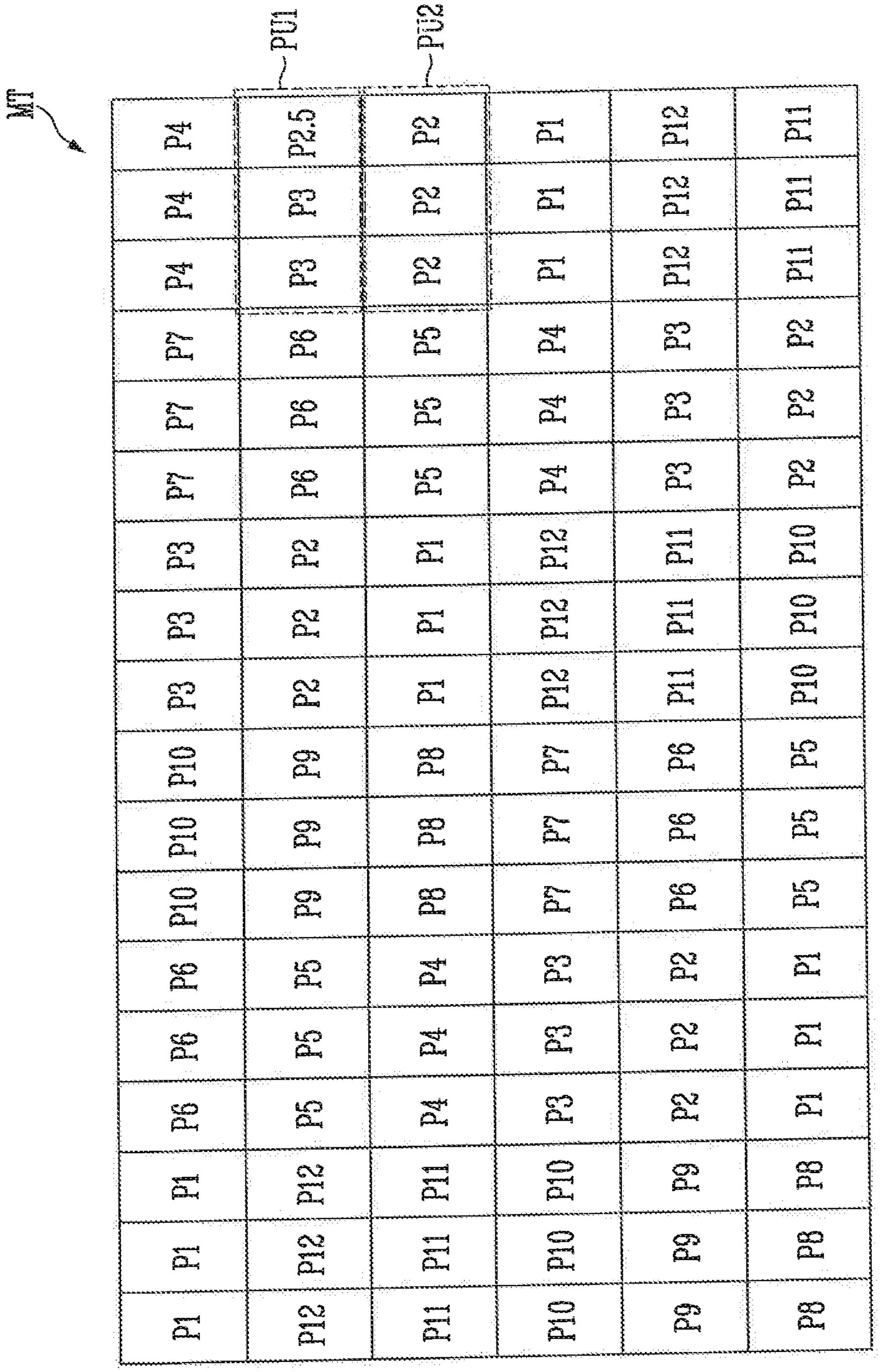
FIG. 9 is a diagram illustrating an example of rendering according to a method of displaying a stereoscopic image according to an embodiment of the disclosure.

FIG. 9 is a diagram illustrating an example of rendering according to a method of displaying a stereoscopic image according to embodiments of the disclosure.

Since the method of displaying the stereoscopic image according to the present embodiment is substantially the same as a configuration of the method of displaying the stereoscopic image of FIG. 1 except for rendering, the same reference numerals and reference symbols are used for the same or similar components, and an overlapping description is omitted.

Referring to FIGS. 4 to 7 and 9, the two-dimensional renderer 1130 generates the rendering image data RIMG for each of the viewpoints P1 to P12 by rendering the three-dimensional model TDM. The rendering image data RIMG may be two-dimensional image data for each of the viewpoints P1 to P12 of the three-dimensional model TDM. For example, the display device may display the rendering image data RIMG for the first viewpoint P1 on the sub-pixels SP that emit light refracted to the first viewpoint P1, and may display the rendering image data RIMG for the second viewpoint P2 on the sub-pixels SP that emit light refracted to the second viewpoint P2.

The three-dimensional model TDM may be rendered with respect to the sub-pixels SP mapped to at least two adjacent viewpoints (for example, the first viewpoint P1 and the second viewpoint P2) among the viewpoints P1 to P12.

The lenses LS may be partially misaligned with the display panel 100 during a manufacturing process. In this case, the mapping table MT may be corrected. For example, FIG. 7 may be a mapping table MT before correction, and FIG. 9 may be a mapping table MT after correction.

For example, when the lenses LS are partially misaligned, the light emitted from the third color sub-pixel B of the first pixel unit PU1 may be refracted to both of a direction corresponding to the second viewpoint P2 and a direction corresponding to the third viewpoint P3. In this case, the mapping table MT for the third color sub-pixel B of the first pixel unit PU1 may be corrected from the third viewpoint P3 to a (2.5)-th viewpoint P2.5 (or P2/3). For example, a sub-pixel in the mapping table MT may be labelled as corresponding to two different viewpoints. In addition, the rendering image data RIMG for the third viewpoint P3 may include pixel data of the third color sub-pixel B of the first pixel unit PU1 determined based on pixel data before correction of the third color sub-pixel B of the first pixel unit PU1 and pixel data before correction of the third color sub-pixel B of a second pixel unit PU2. Here, the second pixel unit PU2 may be adjacent to the first pixel unit PU1, and the third color sub-pixel B of the second pixel unit PU2 may be mapped to the second viewpoint P2 adjacent to the third viewpoint P3 mapped to the third color sub-pixel B of the first pixel unit PU1 before correction. In addition, the pixel data may be a grayscale value.

That is, in generating the rendering image data RIMG for the third viewpoint P3, the two-dimensional renderer 1130 may consider only the sub-pixels SP mapped to the third viewpoint P3 and the second viewpoint P2 instead of all sub-pixels SP. Accordingly, rendering of the three-dimensional model TDM may reduce a rendering time compared to generating the rendering image data RIMG for each of the viewpoints P1 to P12 with respect to all sub-pixels SP.

Figure 10:
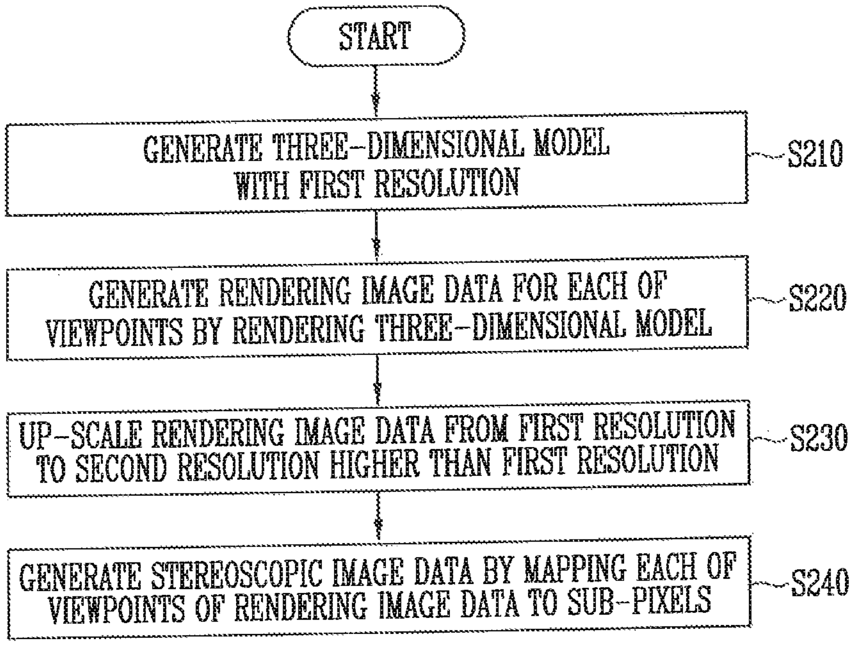
FIG. 10 is a flowchart illustrating a method of displaying a stereoscopic image according to an embodiment of the disclosure.

FIG. 10 is a flowchart illustrating a method of displaying a stereoscopic image according to an embodiment of the disclosure.

Referring to FIG. 10, the method of displaying the stereoscopic image generates a three-dimensional model with a first resolution (S210), generates rendering image data for each of a plurality of viewpoints by rendering the three-dimensional model (S220), performs an up-scaling of the rendering image data from the first resolution to second resolution higher than the first resolution (S230), and generates stereoscopic image data by mapping each of the viewpoints of the rendering image data to sub-pixels (S240).

Hereinafter, the disclosure is specifically described with reference to FIGS. 11 and 12.

Figure 11:
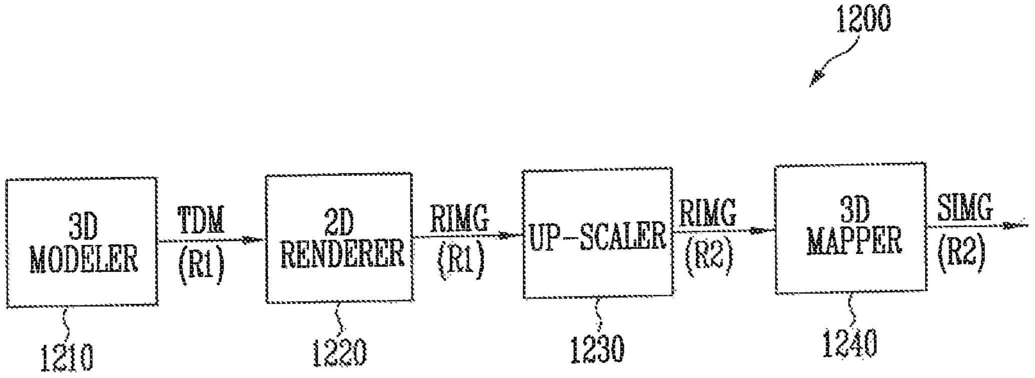
FIG. 11 is a block diagram illustrating an example of a main processor according to the method of displaying the stereoscopic image of FIG. 10.
Figure 12:
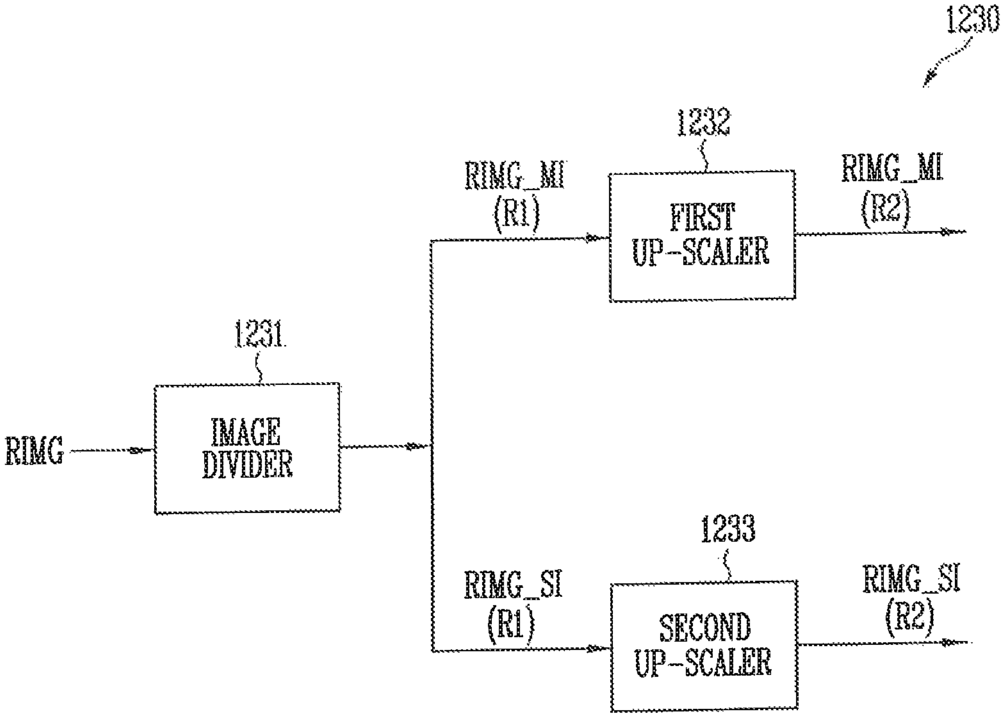
FIG. 12 is a diagram illustrating an example of up-scaling according to the method of displaying the stereoscopic image of FIG. 10.

FIG. 11 is a block diagram illustrating an example of a main processor according to the method of displaying the stereoscopic image of FIG. 10, and FIG. 12 is a diagram illustrating an example of up-scaling according to the method of displaying the stereoscopic image of FIG. 10.

Referring to FIG. 11, the main processor 1200 includes a three-dimensional modeler 1210, a two-dimensional renderer 1220, an up-scaler 1230, and a three-dimensional mapper 1240. In an embodiment, each of the three-dimensional modeler 1210, a two-dimensional renderer 1220, an up-scaler 1230, and a three-dimensional mapper 1240 is implemented by a respective logic circuit.

The three-dimensional modeler 1210 may generate a three-dimensional model TDM. For example, the three-dimensional model TDM may include coordinate information and depth information of an object.

In an embodiment, the three-dimensional modeler 1210 generates the three-dimensional model TDM with a first resolution R1. In an embodiment, the first resolution R1 is lower than a second resolution R2 of the display panel 100. That is, a process of up-scaling the first resolution R1 to the second resolution R2 may be performed to display the three-dimensional model TDM on the display panel 100.

The two-dimensional renderer 1220 may generate rendering image data RIMG for each of the viewpoints P1 to P12 by rendering the three-dimensional model TDM. In an embodiment, the rendering image data RIMG is two-dimensional image data for each of the viewpoints P1 to P12 of the three-dimensional model TDM. The rendering image data RIMG may be data for an image displayed at each of the viewpoints P1 to P12.

The two-dimensional renderer 1220 may generate rendering image data RIMG at the first resolution R1 by rendering the three-dimensional model TDM at the first resolution R1. Accordingly, the two-dimensional renderer 1220 may render the three-dimensional model TDM at the second resolution R2 (that is, the resolution of the display panel), thereby reducing a rendering time compared to a case where the rendering image data RIMG at the second resolution R2 is generated.

The up-scaler 1230 may upscale the rendering image data RIMG at the first resolution R1 to the second resolution R2 higher than the first resolution R1. In an embodiment, the second resolution R2 is the resolution of the display panel 100. For example, up-scaling may be performed through a super resolution algorithm utilizing deep learning. However, the disclosure is not limited to this up-scaling method.

In an embodiment, referring to FIGS. 11 and 12, rendering image data RIMG_MI for a moving image may be up-scaled through an ultra high speed up-scaling algorithm, and rendering image data RIMG_SI for a still image may be up-scaled using a high definition up-scaling algorithm.

For example, the second resolution may be twice the first resolution. For example, the second resolution may be three times the first resolution. For example, the second resolution may be four times the first resolution. As a difference between the second resolution and the first resolution increases, a rendering speed may be further increased.

The up-scaler 1230 may include an image divider 1231 (e.g., a first logic circuit), a first up-scaler 1232 (e.g., a second logic circuit), and a second up-scaler 1233 (e.g., a third logic circuit).

The image divider 1231 may distinguish whether the rendering image data RIMG is image data for a moving image or image data for a still image. In an embodiment, the image divider 1231 may distinguish the moving image and the still image by comparing rendering image data RIMG of a previous frame and rendering image data RIMG of a current frame. In an embodiment, the image divider 1231 may distinguish the moving image and the still image by comparing the three-dimensional model TDM. For example, the image divider 1231 may include a comparator for performing the comparing.

The first up-scaler 1232 may up-scale the rendering image data RIMG_MI for the moving image through the ultra high speed up-scaling algorithm. The ultra high speed up-scaling algorithm may perform up-scaling at a relatively high speed compared to the high definition up-scaling algorithm. For example, the ultra high speed up-scaling algorithm may utilize bicubic interpolation.

The second up-scaler 1233 may up-scale the rendering image data RIMG_SI for the still image through the high definition up-scaling algorithm. The high definition up-scaling algorithm may up-scale at relatively high display quality compared to the ultra high speed up-scaling algorithm. For example, the high definition up-scaling algorithm may utilize a fast super resolution convolutional neural network.

Referring to FIG. 11, the three-dimensional mapper 1240 may generate the stereoscopic image data SIMG by mapping each of viewpoints of the rendering image data RIMG to the sub-pixels.

The three-dimensional mapper 1240 may determine the sub-pixels on which each of the viewpoints of the rendering image data RIMG is displayed. In addition, the three-dimensional mapper 1240 may generate the stereoscopic image data SIMG by summing the rendering image data RIMG for each of the viewpoints.

Figure 13:
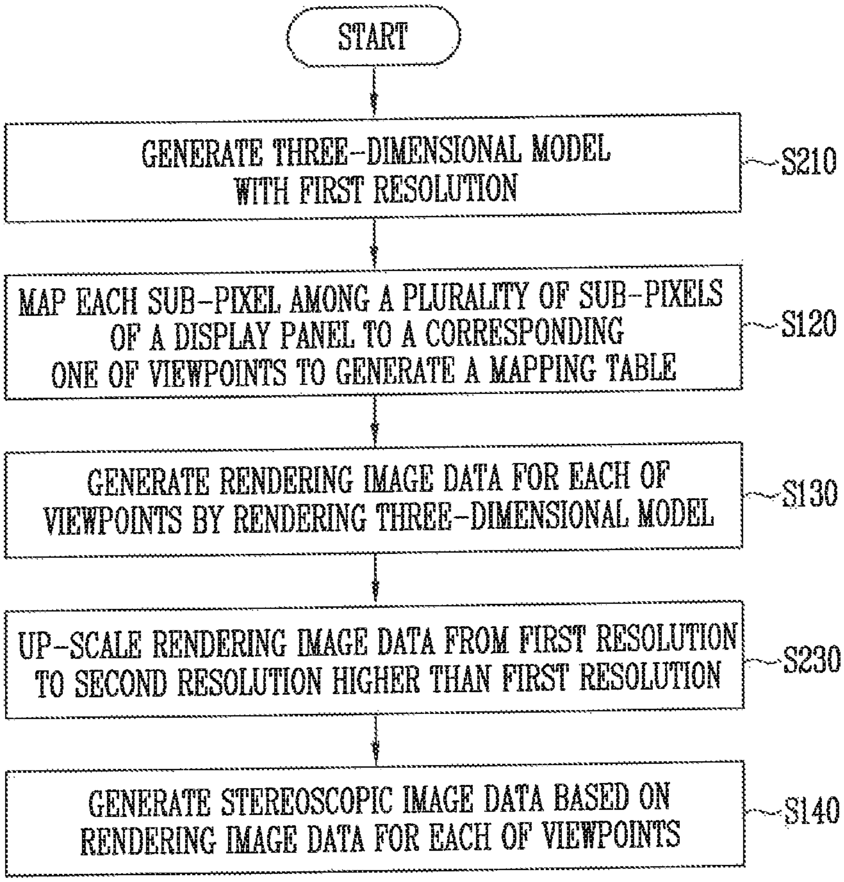
FIG. 13 is a flowchart illustrating a method of displaying a stereoscopic image according to an embodiment of the disclosure.

FIG. 13 is a flowchart illustrating a method of displaying a stereoscopic image according to an embodiment of the disclosure.

Since the method of displaying the stereoscopic image according to the present embodiment is substantially the same as the configuration of the method of displaying the stereoscopic image of FIG. 1 except for modeling and up-scaling, the same reference numerals and reference symbols are used for the same or similar components, and an overlapping description is omitted.

Referring to FIG. 13, according to an embodiment, the method of displaying the stereoscopic image includes: generating a three-dimensional model with a first resolution (S210); mapping each of a plurality of viewpoints of the three-dimensional model to sub-pixels (S120); generating rendering image data for each of the viewpoints by rendering the three-dimensional model (S130); up-scaling the rendering image data from the first resolution to a second resolution higher than the first resolution (S230); and generating stereoscopic image data based on the rendering image data for each of the viewpoints (S140).

Hereinafter, the disclosure is specifically described with reference to FIG. 14.

Figure 14:
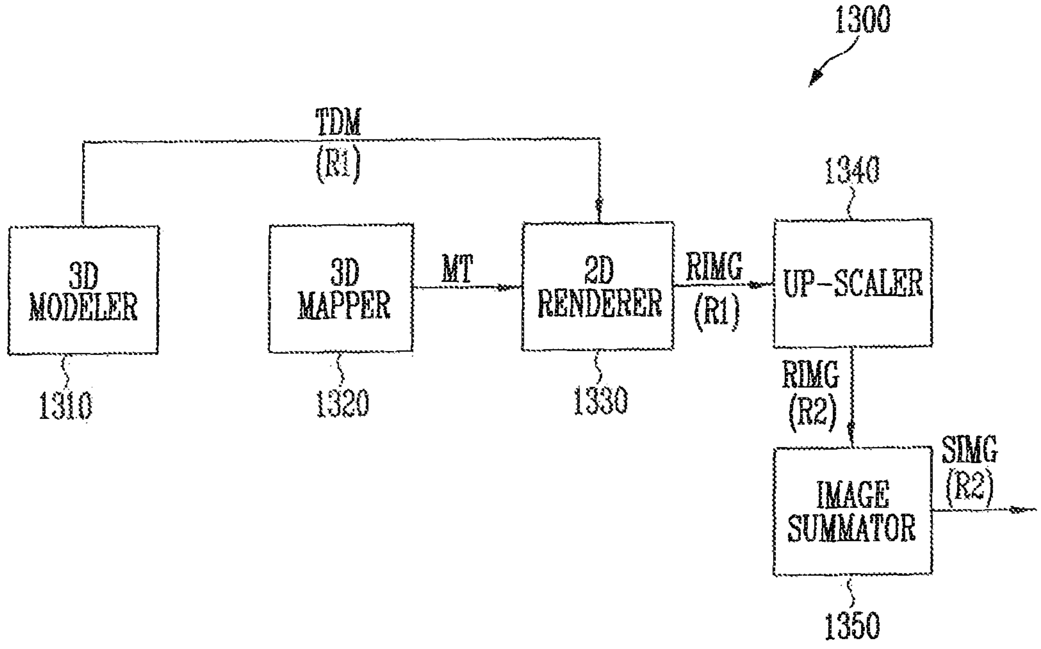
FIG. 14 is a block diagram illustrating an example of a main processor according to the method of displaying the stereoscopic image of FIG. 13.

FIG. 14 is a block diagram illustrating an example of a main processor according to the method of displaying the stereoscopic image of FIG. 13.

Referring to FIG. 14, in an embodiment, the main processor 1300 includes a three-dimensional modeler 1310, a three-dimensional mapper 1320, a two-dimensional renderer 1330, an up-scaler 1340, and an image summator 1350. In an embodiment, each of the three-dimensional modeler 1310, the three-dimensional mapper 1320, the two-dimensional renderer 1330, the up-scaler 1340, and the image summator 1350 are implemented by a logic circuit.

The three-dimensional modeler 1310 may generate a three-dimensional model TDM. For example, the three-dimensional model TDM may include coordinate information and depth information of an object.

In an embodiment, the three-dimensional modeler 1310 generates the three-dimensional model TDM with a first resolution R1. In an embodiment, the first resolution R1 is lower than second resolution R2 of the display panel 100. That is, a process of up-scaling the first resolution R1 to the second resolution R2 may be performed to display the three-dimensional model TDM on the display panel 100.

The up-scaler 1340 may upscale the rendering image data RIMG from the first resolution R1 to the second resolution R2 higher than the first resolution R1. In an embodiment, the second resolution R2 is the resolution of the display panel 100. However, the disclosure is not limited to this up-scaling method.

The disclosure may be applied to a display device and an electronic device including the display device. For example, the disclosure may be applied to a digital TV, a 3D TV, a mobile phone, a smart phone, a tablet computer, a VR device, a PC, a home electronic device, a notebook computer, a PDA, a PMP, a digital camera, a music player, a portable game console, a navigation system, and the like.

Although various embodiments have been described above, it will be understood that those skilled in the art can variously modify and change the disclosure without departing from the spirit and scope of the disclosure described in the claims below.

What is claimed is:

1. A method of displaying a stereoscopic image, the method comprising:

processing image data of a plurality of viewpoints to generate a three-dimensional model;

mapping each sub-pixel among a plurality of sub-pixels of a display panel to a corresponding one of the viewpoints to generate a mapping table;

generating, for each of the plurality of viewpoints, rendering image data by rendering the three-dimensional model for the respective viewpoint in accordance with the mapping table such that pixel values are generated for sub-pixels mapped to the respective viewpoint; and generating stereoscopic image data from the rendering image data for each of the plurality of viewpoints.

2. The method according to claim 1, wherein the three-dimensional model is rendered with respect to the sub-pixels mapped to the same viewpoint among the viewpoints.

3. The method according to claim 1, wherein the three-dimensional model is rendered with respect to the sub-pixels mapped to at least two adjacent viewpoints among the viewpoints.

4. The method according to claim 1, wherein the three-dimensional image data is generated by summing the rendering image data for each of the viewpoints.

5. The method according to claim 1, wherein the processing of the image data generates the three-dimensional model at a first resolution, and the method further comprises up-scaling the rendering image data from the first resolution to a second resolution higher than the first resolution.

6. The method according to claim 5, wherein the second resolution is a resolution of the display panel.

7. The method according to claim 5, wherein the up-scaling is performed through a super resolution algorithm utilizing deep learning.

8. The method according to claim 5, wherein the rendering image data for a moving image is up-scaled through an ultra high speed up-scaling algorithm, and the rendering image data for a still image is up-scaled through a high definition up-scaling algorithm.

9. The method according to claim 8, wherein the ultra high speed up-scaling algorithm utilizes bicubic interpolation.

10. The method according to claim 8, wherein the high definition up-scaling algorithm utilizes a fast super resolution convolutional neural network.

11. A method of displaying a stereoscopic image, the method comprising:

processing image data to generate a three-dimensional model at a first resolution;

generating rendering image data for each of a plurality of viewpoints by rendering the three-dimensional model;

up-scaling, for each of the plurality of viewpoints, the rendering image data from the first resolution to a second resolution higher than the first resolution to generate up-scaled rendering image data for each of the plurality of viewpoints; and generating stereoscopic image data by, for each of the plurality of viewpoints, mapping the up-scaled rendering image data for the respective viewpoint to sub-pixels corresponding to the respective viewpoint.

12. The method according to claim 11, wherein the second resolution is a resolution of a display panel including the sub-pixels.

13. The method according to claim 11, wherein the up-scaling is performed through a super resolution algorithm utilizing deep learning.

14. The method according to claim 11, wherein the rendering image data for a moving image is up-scaled through an ultra high speed up-scaling algorithm, and the rendering image data for a still image is up-scaled through a high definition up-scaling algorithm.

15. The method according to claim 14, wherein the ultra high speed up-scaling algorithm utilizes bicubic interpolation.

16. The method according to claim 14, wherein the high definition up-scaling algorithm utilizes a fast super resolution convolutional neural network.

17. An electronic device comprising:

a main processor configured to generate stereoscopic image data based on image data; and a display device displaying a stereoscopic image based on the stereoscopic image data, wherein the display device comprises:

a display panel including sub-pixels;

lenses overlapping the sub-pixels; and a display panel driver configured to drive the display panel, and the main processor is configured to:

process the image data of a plurality of viewpoints to generate a three-dimensional model;

map each of the sub-pixels to a corresponding one of the viewpoints to generate a mapping table;

generate, for each of the plurality of viewpoints, rendering image data by rendering the three-dimensional model for the respective viewpoint in accordance with using the mapping table such that pixel values are generated for sub-pixels mapped to the respective viewpoint; and generate the stereoscopic image data based on the rendering image data for each of the plurality of viewpoints.

18. The electronic device according to claim 17, wherein the three-dimensional model is rendered with respect to the sub-pixels mapped to the same viewpoint among the viewpoints.

19. The electronic device according to claim 17, wherein the three-dimensional model is rendered with respect to the sub-pixels mapped to at least two adjacent viewpoints among the viewpoints.

20. The electronic device according to claim 17, wherein the processing of the image data generates the three-dimensional model at a first resolution, and the display panel driver up-scales the rendering image data from the first resolution to a second resolution higher than the first resolution.

* * * * *